United States Patent [19]

Near et al.

[11] Patent Number: 4,799,052

[45] Date of Patent: Jan. 17, 1989

[54] METHOD FOR COMMUNICATING DATA ON A COMMUNICATION NETWORK BY TOKEN PASSING

[75] Inventors: Timothy P. Near, Athens, Ga.; Joseph J. Cieri, Hood; Kenneth M. Holet, Earlysville, both of Va.

[73] Assignee: General Electric Company, Charlottesville, Va.

[21] Appl. No.: 818,222

[22] Filed: Jan. 13, 1986

[51] Int. Cl.$^4$ .................. H04Q 11/00; H04J 3/02; H04J 3/24

[52] U.S. Cl. .................. 340/825.5; 340/825.51; 340/825.52; 370/89; 370/85

[58] Field of Search .................. 340/825.03, 825.05, 340/825.5, 825.51, 825.52; 370/85, 86, 89, 94

[56] References Cited

U.S. PATENT DOCUMENTS

| | | | |
|---|---|---|---|
| 4,459,588 | 7/1984 | Grow | 370/89 |
| 4,495,493 | 1/1985 | Segarra et al. | 340/825.05 |
| 4,556,974 | 12/1985 | Kozlik | 370/89 |
| 4,566,098 | 1/1986 | Gammage et al. | 340/825.05 |
| 4,583,089 | 4/1986 | Cope | 340/825.5 |
| 4,587,650 | 5/1986 | Bell | 370/89 |
| 4,590,468 | 5/1986 | Stieglitz | 340/825.5 |
| 4,604,742 | 8/1986 | Hamada et al. | 370/89 |

Primary Examiner—Robert L. Griffin
Assistant Examiner—Ralph E. Smith
Attorney, Agent, or Firm—Ormand R. Austin

[57] ABSTRACT

A method of determining access on an electronic serial bus by implicit token passing. The serial bus receives and transmits data between a plurality of devices. Each device has a receiver for receiving data to the serial bus, a transmitter for transmitting data to the serial bus, a bus idle timer for detecting an idle condition on the bus, and a bus access timer for controlling access to the serial bus. Each device is assigned a unique bus address. The bus access timer of each device is loaded with a value representative of each device's own unique bus address and the unique bus address of the transmitting device. The bus access timer starts a count upon receiving an end of transmission condition from the transmitting device and stops upon receiving a start of transmission condition from the transmitting device. When a bus access timer of a device reaches a predetermined value, the device of the timed out bus access timer is given access to the bus.

25 Claims, 3 Drawing Sheets

METHOD FOR COMMUNICATING DATA ON A COMMUNICATION NETWORK BY TOKEN PASSING

BACKGROUND OF THE INVENTION

1. Field of the Invention

This invention generally relates to a method where multiple devices sharing a transmission medium arbitrate the use of that medium, and more particularly to a method of communicating between a plurality of devices on a communication network by implicit token passing.

2. Background Discussion

Computer automation control is creating spectacular breakthroughs in industry. These breakthroughs have been made available for industry through the design and use of microprocessors and other hardware units. Microprocessors are controlling a variety of industrial automation control environments. These devices control a variety of functions, or monitor numerous conditions on an assembly line. It is particularly important that these devices communicate with each other at critical times. They have to access each other through the use of a communication network. A communication network incorporates the idea of allowing each device to communicate with another device on the network.

In the past, the devices communicated through a local network operated in a master/slave environment. A master controller was responsible for communications on the network. The master controller allowed a slave device to communicate only upon commands from the master controller. In this type of environment, the master controller was always informed of the type of devices on the network and the address of each device on the network. To be serviced, the slave devices were polled one at a time by the master controller. The slave devices could not communicate with another slave device without the intervention of the master controller. Because of these limitations, it was difficult for a device to be added to a network without the need for reconfiguring slave device addresses and the master controller.

As a result of this master/slave environment, many computer automation systems tended to be somewhat slow in communicating the results of tasks by the slave devices to the master controller. Some attempts have been made to alleviate this annoying problem; however, the results have not been altogether too satisfying. For example, one solution is to provide an address control line, a parallel data line, and an interrupt line from each slave device to the master controller. If the device needs service by the master controller, the slave device activates the interrupt line. The interrupt signals the master controller that the slave device needs service. However, if the master controller was busy, the slave device still waited for the master controller. Unless the master controller was fast enough, important high priority control data was lost.

Even in transmitting the data to the master controller, the slave device was forced to 'listen' to the address/control lines. If the master controller gives network access to the slave device, the slave device can transmit data as requested by the master controller. This solution, unfortunately, severely limits the ability of the slave devices to communicate with each other. It further requires a single master controller unit to control all communications on the network.

Another problem in using a master controller in a computer automated control environment is single point failure. If the master controller is faulty or breaks down, the consequences can be serious. The entire automated assembly is literally shut down because of the single failure of the master controller. To overcome single point failures, many systems are designed with redundant master controllers to serve as backup. Accordingly, the expense and complexity of these systems is significantly increased. In addition to the problem of a single point failure, the requirement for a multitude of address/control lines, data lines, and interrupt lines to run between a master controller and the slave devices is considerably expensive. A considerable amount of effort is expended in designing computer automation systems to meet these critical needs.

Another solution provided a network configuration which allowed the slave devices to compete equally for network access. The system required devices to listen to the network to determine if the network was idle. If the network was idle, a device could attempt to transmit data on the network. However, another device could transmit at the same time, resulting in a collision on the network between data blocks. The devices would either have to resort to a rather complex method of collision avoidance to transmit their data or report the collision to a master controller to arbitrate network access. Collisions result in the data arriving at a destination at uncertain times. The collision avoidance network system was found to be unacceptable for computer automation control, because of the uncertainty in data transfer timing.

Therefore, it is an object of the present invention to provide a high integrity network designed for peer-to-peer communications between devices in an automation control environment.

It is another object of the present invention to provide a method for devices to have access to a network without the control of a master controller to arbitrate network access.

It is a further object of the present invention to provide a method for devices communicating on a network in which collisions are minimized.

It is yet another object of the present invention to provide for devices on a network, a method for the transfer of high priority foreground data in real time and still allow the transfer of low priority background data.

It is still another object of the present invention to provide collision-free access to the network when a device has been powered up.

It is a further object of the present invention to provide a re-synchronization method for network access for devices to recover after encounter noise in the system.

SUMMARY OF THE INVENTION

The present invention comprises a method for controlling access on a communication network having a medium for receiving and transmitting data between a plurality of devices. Each device has a receiver for receiving data from the medium, a transmitter for transmitting data to the medium, and a medium access timer for controlling access to the medium.

The method of determining the access to the medium by each device comprises the steps of: assigning each device a unique medium address number; loading each medium access timer of each device with a value representative of the unique medium address number; starting a count on each medium access timer; comparing the count on each medium access timer to a predetermined value; transmitting on the medium when a medium access timer reaches the predetermined value; stopping the count on each medium access timer upon receiving a first transmission condition from any transmitting device; starting a count on each activated medium access timer upon receiving a second transmission condition from the transmitting device; and allowing each device access to the medium depending upon the count in the medium access timer of each device.

Preferably, the present invention includes a method allowing a plurality of devices to access a serial bus by implicitly passing a token. The master controller is completely eliminated from the bus and each device is responsible for accessing the bus.

Since the device which currently possesses the token does not need to know the next device to which the token must be passed, the token passing is implicit. This allows a true peer-to-peer bus with no master controller presence required for arbitrating bus access.

Each bus device is assigned a serial bus address before system startup. Bus devices obtain access one at a time in order of their serial bus address. The serial bus address of the device that currently has bus access is referred to as the token. Each device must broadcast its serial bus address onto the bus, at sometime during its bus access so that all other bus devices are aware of the current token. If a particular serial bus address is not used, i.e., a device is inactive, the token is automatically passed through the inactive device to the next higher active serial bus address. Each bus address of an inactive device is thus skipped.

If a device misses a token due to noise or by just having powered up, it will recover the token within one bus cycle time and thus be re-synchronized. The bus cycle time (bus scan) is the total time required for each active device to access the bus at least once.

In the first embodiment, a device gains bus access when its bus access timer expires. When the device has bus access, it transfers any number of data blocks onto the bus. The last data block from the device is a special block containing a unique 'start of block' character and ending in an end of transmission character. The other devices on the bus sense the device is finished transmitting by the end of transmission character.

When the device to first gain access to the bus begins transmitting, it is 'heard' by all other devices. Reception of the start bit of the first character by the other devices causes their own bus access timer to stop. As soon as a device receives an end of transmission character from another device, it starts its own unique bus access timer. Thus, when the device transmits onto the bus, another bus device does not transmit on the bus, because the bus access timer for another device is stopped when it detects the transmission from the first device. The bus access timers are loaded and restarted when the end of transmission character is received by each device.

In order to guarantee a collision-free bus access, the value loaded into each device's access timer is unique. The value loaded into each device's bus access timer is a function of the bus address and accounts for bus propogation and receiver/transmitter delays between the device and the bus, as well as for any devices which may be missing between the device which transmitted the end of transmission and its own bus address.

A two-level bus access scheme can also be supported on the bus network. The data protocol is segmented into two basic services, foreground data messages and background data messages. Foreground data messages provide for a global wide exchange of real time, control data on the bus and are transmitted every bus scan.

Background data messages provide a non-realtime mechanism for the transfer of diagnotics, configuration, and other types of event driven data. Since foreground data has top priority and is transmitted every bus scan, its response time is only effected by the amount of background traffic. In order to maintain a specific control data response time, it is desirable to restrict the amount of background traffic. To accomplish this a bus device can have a restricted or nonrestricted bus access. If a bus device is programmed to be restricted, it will not transmit a background message during its turn, unless no other bus devices, including itself, have transmitted a background message since its previous turn. This means that a restricted device may transmit a background message every other scan if no other devices are transmitting background messages. If a device is programmed to be nonrestricted, it may transmit a background message any time it gains bus access without regard to other devices' transmissions.

BRIEF DESCRIPTION OF THE DRAWINGS

While the present invention will be described with particular reference to the accompanying drawings in which certain operating environments of the method of the present invention are shown, it is to be understood that the methods in accordance with the present invention may be varied from the specific form described hereinafter, while still obtaining the desired results of this invention. For a better understanding of the present invention, reference may be had to the following detailed description taken in conjunction with illustrative drawing in which.

DESCRIPTION OF AN ILLUSTRATIVE EMBODIMENT

A. General Description

Figure 1:
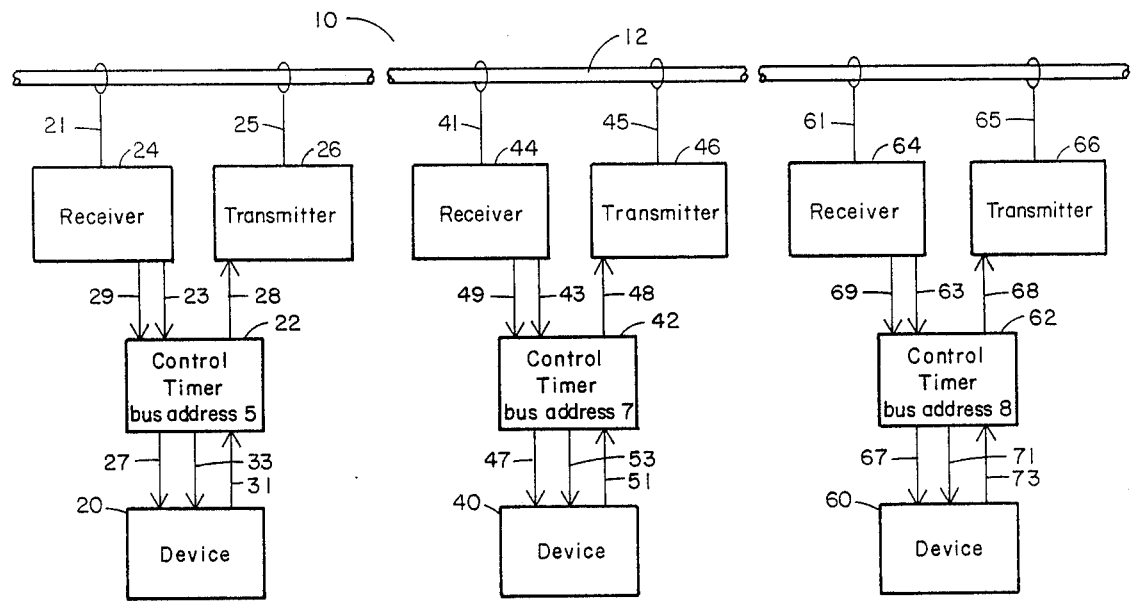
FIG. 1 illustrates a plurality of devices for transmitting and receiving on a bus network.

FIG. 1 illustrates a plurality of devices designed to communicate over a bus 12. The system, generally designated by the reference numeral 10, includes a bus 12 for interconnecting a plurality of devices 20, 40 and 60. Devices 20, 40 and 60 receive data from bus 12 through bus receivers 24, 44 and 64, connected by respective lines 21, 41 and 61. Devices 20, 40 and 60 transmit data to the bus 12, respectively, by transmitters 26, 46 and 66 through lines 25, 45 and 65. Control timers 22, 42 and 62 are respectively coupled between devices 20, 40 and 60 and receivers 24, 44 and 64. Control timers 22, 42 and 62 are also respectively coupled between devices 20, 40 and 60 and transmitters 26, 46 and 66. For clarity and simplicity the devices 20, 40 and 60 are shown in order; however, for the method described herein the order is unimportant.

The receivers 24, 44 and 64 are any type of digital communication receivers which receive serial data from the bus over lines 21, 41 and 61 respectively. The transmitters 26, 46 and 66 are communications transmitters that transmit serial asynchronous data to the bus through lines 25, 45 and 65, respectively. The receivers 24, 44 and 64 communicate respectively with control timers 22, 42 and 62 via lines 23, 43 and 63. In addition to receiving data, the receivers 24, 44 and 64 check the quality of reception from the bus 12. If a transmission error is detected, an error condition is sent to its own control timer 22, 42 and 62 through lines 29, 49 and 69, respectively. The transmitters 26, 46 and 66 communicate respectively with control timers 22, 42 and 62 via lines 28, 48 and 68. The receivers and transmitters are well known to those having ordinary skill in the art.

The control timers 22, 42 and 62 contain the necessary timers to control access of the devices 20, 40 and 60 to the bus 12. The control functions are implemented by the necessary hardware such as counters, registers, and memory units for performing those functions described in FIG. 1 through FIG. 6. Each control timer 22, 42 and 62 contains a unique bus address. For explanation purposes, in our illustrated example, the control timer 22 for device 20 has a unique address of five. The control timer 42 for device 40 has a unique address of seven, and the control timer 62 for device 60 has a unique address of eight. Note that a device may be assigned more than one bus address. If a device has more than one bus address, the device is allowed to access the bus more often than a device with one bus address.

Each of the devices 20, 40 and 60 receive data from its own control timer 22, 42 and 62, through lines 27, 47 and 67 and transmit data to its own control timer 22, 42 and 62 through lines 31, 51 and 71. The devices 20, 40 and 60 may be devices for controlling a particular function on assembly line such as closing contacts or monitoring a process on the assembly line. The control timers 22, 42 and 62 control access to the bus 12 for devices 20, 40 and 60, respectively. Since each device 20, 40 and 60 send its respective data to its own control timer 22, 42 and 62, each device is allowed the freedom of controlling its particular task without the burden of trying to access the bus 12. For example, the control timer 22 receives and stores data designated for device 20 via line 21 from the bus 12. The control timer 22 signals the device 20 over line 33 that it has data available for the device. The device 20 can then access control timer 22 to obtain the data. Similar, in transmitting data, device 20 transmits data over line 31 to control timer 22. The control timer 22 controls the reception and transmission of the data from the device 20 to the bus 12.

Each bus device is assigned a bus address before the system startup. The bus address for the device which currently has bus access is referred to as the token. A device which has access to bus 12 through its control timer transmits a single frame of data. A frame of data consists of a string of bits or characters. Each frame of data contains a unique identification code which identifies the bus address of the device which transmitted it. The frame of data ends with a special character or a sequence of bits which identify the end of frame transmission.

At the end of a transmission of a valid frame, the devices 20, 40 and 60 are allowed a chance to gain access to the bus 12 in order of their bus address. The device which possesses the bus address which is one greater than the bus address of the device of the last transmitted frame transmits first. Because of transmission line delay and receiver and transmitter delay, each device must be quiet after the transmission of a frame before another device is allowed to transmit. If a device misses a token due to noise or by just having powered up, it will recover the token within one bus cycle time (bus scan) by receiving the messages from other devices, or if it is the only device, by time out. A bus cycle time is a time required for each active device to have access to the bus at least once.

A skip time is defined as the maximum amount of time required for a device to respond to an end of transmission condition and starts to transmit. The skip time must be long enough to guarantee that two or more devices cannot determine that it is their turn to transmit so that each begins transmitting before they hear each other, and a collision occurs. It is desirable to keep the skip time as short as possible so that the time required to skip an address of an idle or nonexistent device is minimized. The minimum value of the skip time on the bus is a function of the maximum transmission line delay and transceiver delays. The minimum value for the skip time is equal to:

Minimum skip time =  equation (1)

2 * (maximum transmission line delay) +

2 * (maximum receiver delay) +

(maximum transmitter turn on delay).

The maximum transmission time delay is the maximum allowable time between the start of a pulse at the bus 12 connection at one device and the arrival of the pulse at the cable connection to any other device. The maximum receiver delay is a maximum allowable time between the arrival of any particular bit at the cable connection of a device and the device's recognition that the bit has just been received. The receiver delay may also be referred to as a device bit recognition time.

The time for the next device to transmit must be long enough to allow a device to begin transmitting and for all other devices to detect it. This is the time a device receives a frame and determines that its bus address is one more that the bus address of the device that last transmitted the token.

If the device is a device that operates under software control, such as a microprocessor control device, the operating system of the microprocessor may be in a software routine other than a token recognition software routine. Thus, there is a delay in the device's response to recognize that the current transmission has terminated that is caused by the software. This delay is called the software delay. The allowable software delay is taken to be equal to two skip times. The minimum time for the next device to transmit is equal to the software delay plus the skip time.

B. Description of the Control Timer

Figure 2:
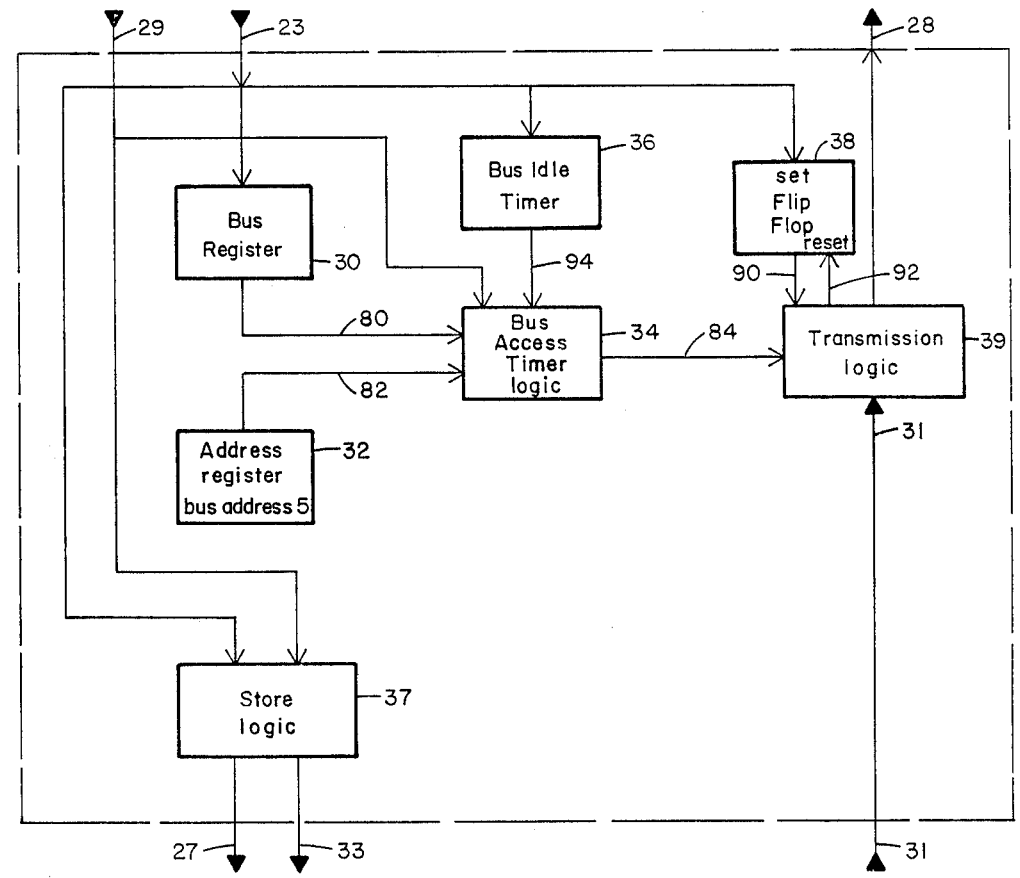
FIG. 2 is a schematic block diagram of a control timing unit.

Referring now to FIG. 2 there are shown the component parts of the control timer 22. The control timer 22 comprises a bus register 30, an address register 32, a bus access timer and logic 34, a bus idle timer 36, a store logic unit 37, a transmission logic unit 39, and a flip-flop 38. It is understood that each control timer for each device contains the necessary digital hardware, such as counters, registers, and memory units to accomplish the functions as described, in a manner well known in the art. Every device has a control timer with similar components that perform the same function as the control timer 22.

The bus register 30 contains the current token which is the bus address of the device that currently has access to the bus. The address register 32 contains a preselected address between the numbers 0-31, for 32 devices on a bus. It is to be understood that if more than 32 devices are present on the bus, the bus addresses will be increased an appropriate number. For clarity in our example, the bus address for device 20 is five, for device 40 the bus address is seven and for device 60 the bus address is eight. When a device sends the start of block character with its bus address, the bus register 30 is loaded with the current token.

The bus register 30 and address register 32 are used by the bus access timer logic 34 to control the transmission logic 30 through control signals on line 84. The transmission logic 39 stores data received on line 31 from the device 20, and transmits the data to the bus 12 via line 28. The transmission logic 39 also senses the flip-flop 38 through line 90 to control restricted/nonrestricted use of background messages. The transmission logic 39 resets flip-flop 38 via line 92. The bus idle timer 36 detects any idle time on the received line 23 and sends a signal on line 94 to the bus access timer logic 34. Any idle time on line 23 corresponds to idle time on the bus 12. A signal is sent to the bus access timer logic 34 via line 29 on any error condition detected by the receiver 24.

The store logic 37 receives data from the receiver 24 via line 23 and stores the data in a data buffer (not shown) of the store logic 37, in a manner well known in the art. The store logic 37 detects any error signal from the receiver on line 29. The store logic 37 signals the device on line 33 that data is present and holds the data until transferred to the device via line 27.

The bus access timer 34 is loaded via line 80 with a value depending upon the token in the bus register 30 and the value in the address register 32 through line 82. There are three cases for the value loaded into the bus access timer 34, which are explained, by way of example, for clarity.

Referring to FIG. 1, assume bus address five receives an end of transmission from bus address four, when bus address four finishes transmitting on the bus. In this circumstance, the bus access timer of bus address five is loaded with a time equal to zero and started. When the bus access timer times out, bus address five will begin transmitting on the bus.

In the second case, the bus address five receives an end of transmission from other than bus address four. In this circumstance, the bus access timer 34 is loaded with a time equal to the software delay, plus the skip time times the bus address five minus the token minus 1, or SD+SKIP* [(Device Address-Current Token-1) mod 32]. For this example, it loads SD+SKIP* [(5-Current Token-1) mod 32]. It is important to note that this time will never be negative since the time is calculated as a modulo of the number of devices present on the bus. For example, if the device's bus address is five and the token is 8 and there are 32 devices on the bus, then [5−8−1], mod 32 equals 28. In this example, the bus access timer will be loaded with 30 skip times.

For the third case, bus address five detects a CRC error or a powering up cycle. A CRC error received from the receiver via line 29 is a cyclic redundancy check error which signifies that a device has transmitted on bus 12 and that there has been an error in the reception or transmission. A cyclic redundancy check is a method well known in the art for determining the validity of transmitted and received data. In this case, the bus access timer 34 is loaded with a value equal to resynchronization time plus the software delay plus the skip time times the device's bus address. The resynchronization time is equal to the bus cycle time. For 32 bus addresses used by a bus, the resynchronization time will be 32 skip times. Thus if bus address five receives a CRC error, the bus access timer 34 of bus address five will be loaded with (32+5+2) skip times or 39 skip times.

Referring now to FIG. 2, when the bus access timer 34 is started, it counts down from its present value. When the bus access timer 34 counts to zero, the device is allowed to access the bus. Note that every device has a bus access timer and the value loaded into the bus access timer will be unique for each device.

The bus idle timer 36, connected to receiver 24 via line 23, monitors any idle time on the bus 12. The bus idle timer 36 detects the presence of an idle line which signifies a problem on the bus 12. For example, if there is an absence of a start bit for longer than a bit time after the completion of a character but not at the normal end of a transmission, there is a bus error and the bus idle timer 36 sends a signal which clears the bus access timer 34. This causes the bus idle timer 36 to be loaded with a resynchronization time plus the software delay plus a skip time times the bus address in the address register 32. In addition to checking the bus for an idle error condition, the bus idle timer 36 contains the necessary hardware to synchronize the clocks of the control timer 22 and the device 20 to other control timers of other devices, in a manner well known in the art.

The flip-flop 38 controls restricted and nonrestricted use of background messages. As mentioned before, there are two types of data messages, foreground messages and background messages. When the receiver 24 detects a background message on the bus and is in the restricted mode it sets the flip-flop 38 through line 23. The transmission logic 39 detects a background message sent on the bus by sampling the state of the flip-flop 38 on line 90. If the flip-flop 38 is set, no background message is sent. The flip-flop 38 is reset by the transmission logic 39 at the beginning of a device's foreground transmission through line 92. Checking at the beginning of the foreground window (implying the relinquishing of background opportunity) prevents one device from continuously sending its background message. It allows another device a chance to send a background message. For example, assume bus address five, as a restricted device, desires to send a background message. If a device is restricted, it will not transmit a background message during its turn unless no other bus devices have transmitted a background message since the beginning of its previous turn. If another device has sent a background message, the flip-flop 38 of bus address five will be set when the transmission logic 39 senses it and the bus address five can not send a background message.

If the flip-flop is not set when the transmission logic 39 desires to send a background message, bus address five is allowed to send the background message. After the transmission of the background message, the transmission logic 39 sets the flip-flop 38. This allows another device on the bus to transmit a background message, before bus address five sends another message. The restricted/nonrestricted use provides for the passage of background messages, while restricting the amount of background traffic. In the case of nonrestricted use, the background flip-flop status is ignored.

C. Timing Diagram

Figure 3:
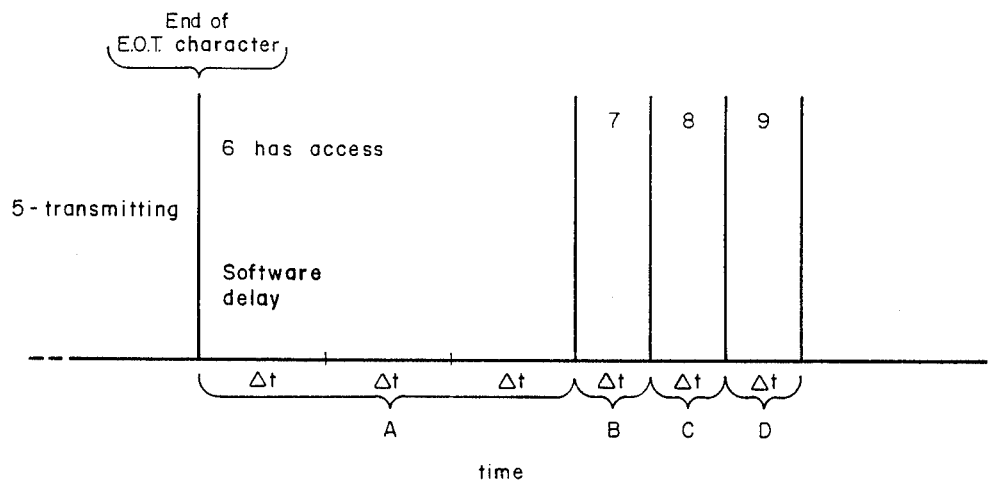
FIG. 3 is a timing diagram illustrating the method of the present invention.

Referring to FIG. 3 there is shown a timing diagram for the devices of FIG. 1. The timing diagram of FIG. 3 is helpful in explaining the operation of the method of the present invention. The timing diagram illustrates that bus address five is finishing transmitting, after having passed its bus address of five, now the token, onto the bus to the other devices. The token itself is embedded in the Start-of-Block-Broadcast-Foreground character, which is the first character of typically the last message block during a transmission. It is important to note that when bus address five is transmitting, the transmission of any character causes the bus access timer of each device to stop. When the bus access timer for the device counts down to zero, it signifies that this device has access to the bus. In our example, bus address five has just finished transmitting and the current token value is five. If a bus address six is present on the bus, bus address six loads its bus access timer with zero. The bus access timer for bus address six immediately times out and bus address six accesses the bus. Thus, if bus address six is present on the bus, the bus address six would have access to the bus immediately after bus address five stops transmitting. Bus address six must access the bus during the three skip times as shown by region A, before bus address seven is given access.

At the same time bus address six receives the current token, bus address seven and bus address eight receive the current token. For bus address seven, the bus access timer loads the software delay plus one skip time where the one skip time is calculated from (7−5−1). The bus address eight calculates a bus access time equal to the software delay plus two skip times. As shown on the timing diagram, the bus address seven accesses the bus during region B after bus address five finishes transmitting. Bus address eight will have access to the bus four skip times after bus address five has finished transmitting. It should be noted that the "access" time to the bus must take into account the delays in loading the first character as well as transmission medium delays and delays to allow all receivers to detect the beginning of the transmission. Typically this means that transmission from the device must begin about halfway through the device's access window.

In our example, however, bus address six is not present, thus bus address six will not access the bus during its access time as shown by region A. However, bus address seven is present, and will access the bus during its access time, shown as region B. When bus address seven accesses the bus, it transmits on the bus which causes the other bus devices to stop their bus access timers. During device seven's transmission it sends a Start-of-Block-Broadcast-Foreground character, containing the embedded token, which causes the other addresses to reload their bus access timers. When bus address seven finishes transmitting, the procedure continues again with bus address eight now being the next device able to transmit. The method continues in this fashion, giving each active device access to the bus.

D. Block Diagram of the Token Passing Method

Figure 4:
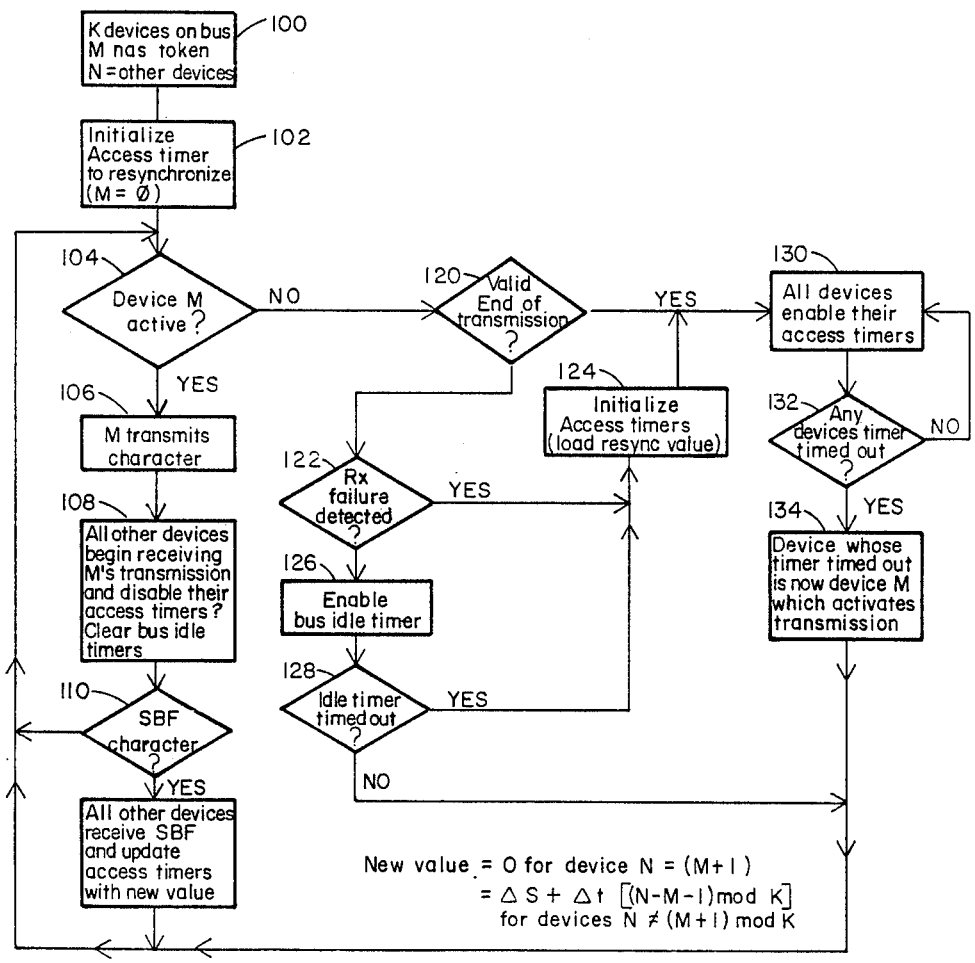
FIG. 4 is a detailed block diagram implementing the method of the present invention.

Referring now to FIG. 4 there is shown a detailed block diagram of the token passing method of the present invention. Starting at step 100, there is shown a bus with the ability to handle K devices on the bus. M is equal to the current bus address (token), which has access to the bus. The routine begins at step 102. In step 102 the devices go through initialization, loading their respective bus access times with the resynchronization value $S+t(K+N-1)$, where N is the address assigned to each block and M is assumed initially to be zero, i.e., the token is given to the first or zero device. In step 104, if the device M is active, then all devices go through the process (shown vertically) of receiving the characters and revising their bus access counters. In step 106 the character is sent by M; in step 108 all the devices begin receiving the character, which disables counting of the access times. In step 110, if the character is a Start-Broadcast-Foreground character containing the token, then the access counter is updated with a new value (step 112). Otherwise, the current count remains (until updated by a subsequent character). If device M is not active (step 104="no"), then it is determined at step 120 how it became so. If end of transmission was normal without errors, then all the devices enable their access times (step 130) with the correct count having already been loaded previously. If an error was detected by the receiver (step 122) since the most recent Start-Broadcast-Foreground character, then the access counter is reinitialized at step 124. If an error was not detected but the line abnormally became idle (not ending transmission with an End of Text character), then the bus idle timer is enabled at step 126. This allows a small amount of idle time to occur between characters (asynchronous transmission), but still allows the detection of bus failures such as device M losing power in mid-transmission. If the bus idle timer is not timed out (step 128), then the devices wait for the next character to arrive (128="no"). If an idle time-out occurs (128="yes") then a bus failure is said to exist and the bus access counter is reinitialized to its resynchronization value (step 124) before being enabled (step 130). After the bus access counter is enabled, the devices wait until the next device's timer times out (step 132). This device becomes the new device M (step 134), which then activates its transmitter (step 104="yes").

E. Second Embodiment of the Invention

Figure 5:
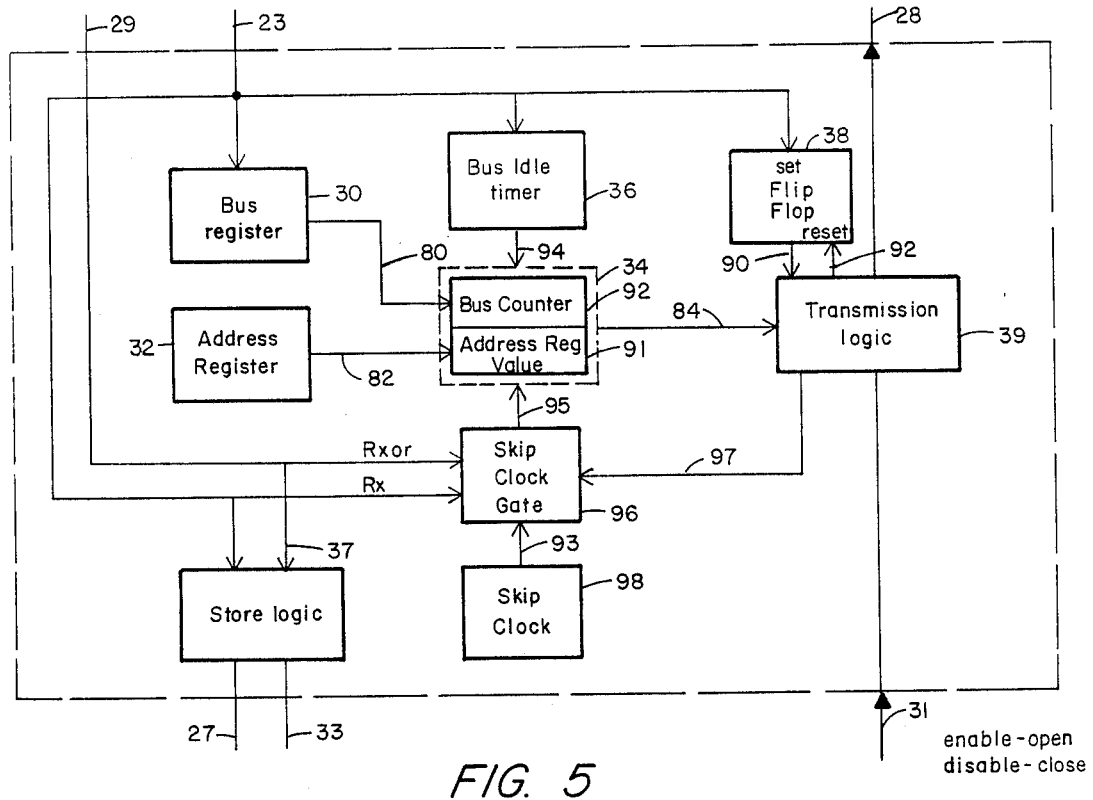
FIG. 5 is a schematic block diagram of another embodiment of the present invention.

Referring to FIG. 5, there is shown a second embodiment of the present invention. In this embodiment, a skip clock gate logic 96 and a skip clock 98 are added to the circuitry of the control timer 22. The bus access timer logic 34 is shown having a bus counter 92 and an address register 91.

The skip clock 98 provides counting signals on line 93 to the skip clock gate 96. The skip clock 98 is a free running clock synchronized to the clock pulses on the receiving line 23 by the bus idle timer 36. The skip clock gate 96 resolves whether the counting signals are allowed to update the bus access timer logic 34. The skip clock gate 96 monitors the received data line 23, the received data validity condition line 29, and an enable line 97 from the transmission logic 39. The counting signals from the skip clock gate update the bus counter 92 over line 95. If the bus counter 92 equals the address counter 91, the transmission logic is enabled via line 84. Line 97 disables the skip clock gate 96 when the transmission logic 39 is enabled. This prevents a timing problem from occurring due to the skip clock gate 96 detecting its own transmission on the received data line 23.

When a device has gained bus access, it transfers a number of blocks (messages). The last data block must also include a unique start of block character (Start-Broadcast-Foreground (SBF), which contains the token information and a special end of transmission character so that other devices on the bus can sense the device is finished transmitting. The SBF character is received by the other devices and causes the bus register 30 to be set to the address of the current device. In other words, the bus register 30 is loaded with the current token value. The token value is loaded through line 80 into the bus counter 92 (the address register value which is the bus address is loaded into the address counter 91 prior to bus operation). When another device is transmitting on the bus, it is detected by the skip clock gate 96 through line 23. The skip clock gate 96 disables any skip clock 98 counting signals from updating the bus counter 92 when there is bus activity on line 29. Since the value of the bus counter 92 is not equal to the value of the address counter 91, the transmission logic 39 is not enabled. Thus, only the transmitting device accesses the bus.

The skip clock gate 96 is enabled at the end of the current transmission detected on the received data line 23. This causes a single counting pulse from the skip clock 98 to update the bus counter 92. The bus counter 92 is compared to the value of the address counter 91. If the bus counter 92 is equal to the address counter 91, then the transmission logic 39 is enabled. The skip clock gate 96 is then disabled for two additional counting pulse times (skip times). The two additional counting signals corresponds to the software delay as described before. If no bus activity is detected on the received data line 23, the skip clock gate 96 remains enabled until activity is detected on the received data line 23. Each skip clock signal thus updates the bus counter 92. Eventually, the bus counter 92 will compare with the value in the address counter 92 and transmission will commence on the bus from that device.

When in the resynchronization mode, such as if there is detected a bus error on the bus through line 29, then the bus counter 92 is cleared by the bus access timer logic 34. The value of the address register 91 is set equal to the number of devices that can be on the bus plus that device's address (=K+N). In this example, there are 32 devices and the value in the address register in device 8 is loaded with 40. Thus the bus counter 92 will count 32 skip clock signals plus the bus address value before the transmission logic 39 is enabled. This corresponds to the resynchronization routine as described previously. Once a new SBF character is received, updating the bus counter, the address register is reset to its original value (equal to the device's bus address (=N)).

Figure 6:
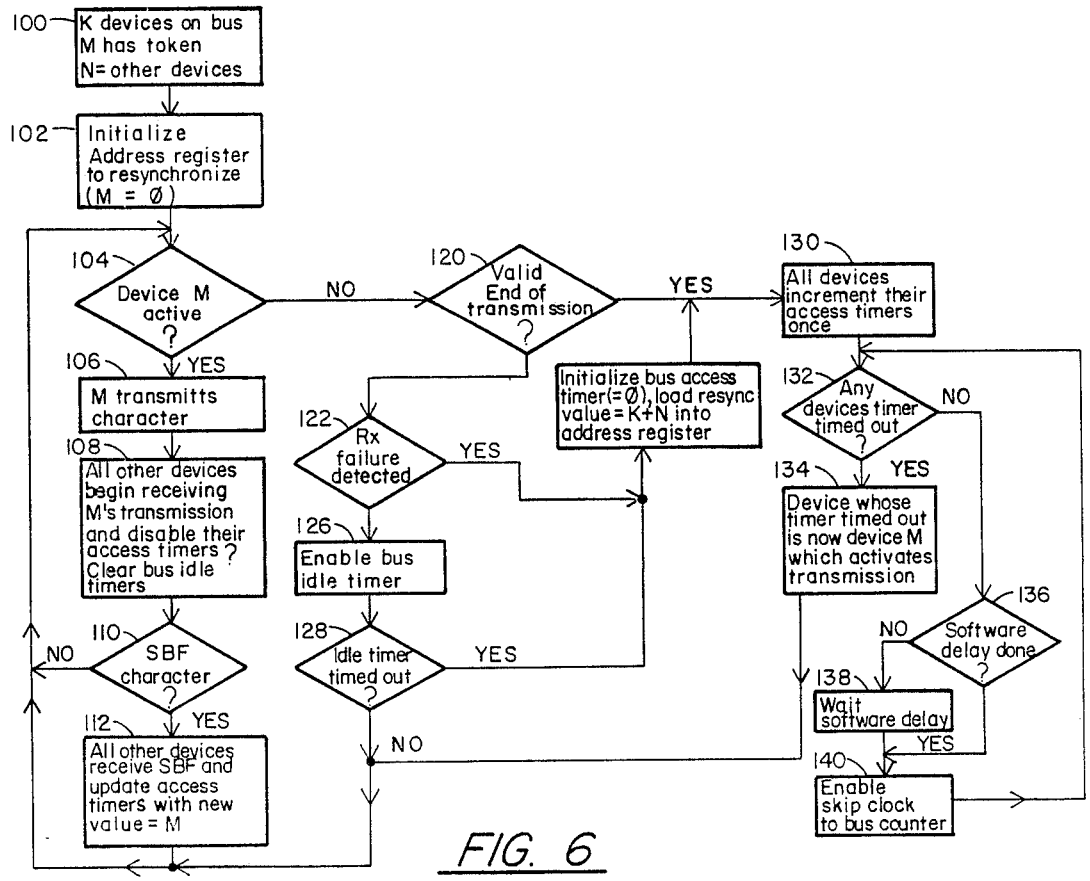
FIG. 6 is a detailed flow diagram implementing the second embodiment of the present invention.

Referring to FIG. 6, there is shown a flow diagram of the method of the second embodiment. The basic pattern of the flow diagram is the same as shown in FIG. 4 and will not be repeated. The significant differences are that: (1) Step 102 and 124 resynchronization is done by clearing the bus counter and loading a different value equal to the address plus the number of modules (=N+K) into the address comparison register 91; (2) at the beginning of the bus access update step 130, all counters immediately increment by one count; (3) If at this time there is no new active device (the address subsequent to the address of the just-finished device is unoccupied, step 132="no"), then a one-time software delay is injected (steps 136, 138), before enabling the bus counters to increment once per skip time interval. The device whose bus counter first equals its address register value (step 134) becomes the new active device.

The particular embodiments shown and described are with reference to a serial bus. It is not intended to limit the transmission medium to a serial bus. However, as is evident, the method of the present invention can be used for a parallel bus or any medium as long as every device sharing that medium can hear the transmissions of all other devices using that medium. The medium could take on such forms as, fiber optics, microwave, radio, and other radiative communication systems.

The serial I/O bus cable of the illustrative embodiments contains a single twisted pair with shield. This cable is daisy chained from one bus device to another in a manner well known in the art. No special sequence of daisy chaining is required by either device type or bus address.

For the illustrative embodiment shown, only 32 devices are assumed to exist on the bus. However, as is evident, the method of the present invention can be used with any number of devices. It is not intended to limit the number of devices to 32, but the number is chosen to simplify the method to give a clear and concise description. The bus 12 can be electrically isolated via a transformer at each device in a manner well known in the art. Data on the bus is sent as asynchronous 11 bit characters; eight bits for data, one start bit, one stop bit and one bit for link control. Each zero bit is sent as three dipulses, where a dipulse is a negative voltage, then positive voltage excursion, with a precisely defined pulse width. The three dipulses are two out of three voted at a receiver before the logic zero bit is accepted. A logic one bit is received as an open line.

Thus there has been shown in the present invention a method which allows a plurality of devices to access a medium without collisions by passing a token. Briefly, each bus device is assigned a bus address before system startup. The bus devices obtain access one at a time in order of the bus address. Each device sends its token onto the bus when it gains access to the bus so that all other bus devices have the current token, and the bus access timer for each device is stopped. At the end of the transmission of the value frame of data the devices are allowed a chance to gain access to the bus in order of number, starting with the device which possesses the number which is one greater than the bus address of the token of the last transmitted frame. As soon as the device receives a transmission, it loads and starts its bus access timer. When the bus access timer expires the device is allowed to transmit onto the bus. In this manner, a collison-free bus access is obtained.

Thus although the bus modes contemplated for carrying out the present invention have been hereinshown and described, it will appear that modification and variation may be made without departing from what is regarded as the subject matter of the invention.

We claim:

1. In a communication network, having a medium for receiving and transmitting data between a plurality of devices, the data comprising foreground messages and background messages, the foreground messages having a higher priority of transmission than background messages; each device having a receiver for receiving data from the medium; a transmitter for transmitting data to the medium; a medium access timer for controlling access to the medium a medium idle timer for detecting an idle condition on the medium; and a detecting means for detecting the transmission of a background message; a method of determining access to the medium by each device comprising the steps of:

(a) assigning each device a unique medium address number;

(b) loading each medium access timer of each device with a value representative of the unique medium address number of the device;

(c) starting a count on each medium access timer;

(d) selecting at least one device to start transmitting data on the medium, the data including the unique medium address number assigned to the transmitting device, a start of transmission condition, and an end of transmission condition;

(e) detecting the transmission of a background message by the detecting means;

(f) setting the detecting means for each device upon detecting the transmission of a background message;

(g) stopping the medium access timer of each device upon receiving the start of transmision condition from the transmitting device;

(h) loading the medium access timer of each device with a value representative of each device's own unique medium address number and the unique medium address of the transmitting device;

(i) starting a count on each medium access timer upon receiving the end of transmission condition from the transmitting device;

(j) comparing each medium access timer to a predetermined value;

(k) permitting access to the medium when the medium access timer of a device reaches a predetermined number;

(l) determining the state of the detecting means of the device upon obtaining access to the medium;

(m) transmitting data on the medium, the data including the unique medium address number assigned to the transmitting device, a start of transmission condition, and an end of transmission condition;

(n) inhibiting the transmission of background messages from the device if the detecting means is set; and (o) resetting the detecting means at the end of transmitting data from the device.

2. The method of claim 1, wherein the step (m) of transmitting further comprises the steps of:

(p) transmitting on the medium after the start of transmission condition the unique medium address number of the transmitting device; and (q) transmitting on the medium at the end of transmission a validity condition representative of the data transmitted between the beginning of transmission and the end of transmission.

3. The method of claim 2 further comprising the steps of:

(r) loading the medium access timer of each device with the value of the unique medium address number of the transmitting device;

(s) starting a count up on each medium access timer upon receiving an end of transmission condition from the transmitting device;

(t) comparing the medium access timer of each device to the unique medium address value of the device; and (u) transmitting on the medium when the medium access timer of a device equals the unique medium address value of the device.

4. The method of claim 2 further comprising the steps of:

(v) loading the medium address number of each device with a value representative of the difference between the unique medium address number of the device and the unique medium address number of the transmitting device;

(w) starting a count down on each medium access timer upon receiving an end of transmission condition from the transmitting device;

(x) comparing the medium access timer of each device to a predetermined number; and (y) transmitting on the medium by a device when the medium access timer of the device reaches the predetermined number.

5. The method of claim 4, wherein the step (v) of loading further comprises the steps of:

(z) loading a medium access timer of a device having the next highest unique medium address number with zero; and (aa) loading the medium access timer of each device that does not have the next highest unique medium address number with a value representative of the difference between the unique medium address number of the device having the next highest medium address number and the unique medium address number of the transmitting device.

6. The method of claim 5, wherein the step (aa) of loading further comprises the step of adding a second predetermined value to the value in the medium access timer.

7. The method of claim 2, further comprising the steps of:

(bb) detecting the validity condition transmitted by the transmitting device; and (cc) determining an error condition from the validity condition of the data received.

8. The method of claim 7, further comprises the step of loading the medium access timer of a device with a value representative of a second predetermined value and the unique medium access number of the device upon determining the error condition.

9. The method of claim 8 wherein the predetermined value is representative of a time for each device to access the medium.

10. The method of claim 2, further comprising the steps of:

(dd) monitoring the medium for an idle condition with the medium idle timer; and (ee) generating an error condition upon detecting an idle condition.

11. The method of claim 10, further comprises the step of loading the medium access timer of a device with a value representative of a second predetermined value and the unique medium access number of the device upon determining the error condition.

12. The method of claim 11 wherein the predetermined value is representative of a time for each device to access the medium.

13. The method of claim 10, wherein the step (r) of monitoring further comprises the step of detecting an idle condition on the medium caused by a premature cessation of transmission of data by the transmitting device with a medium idle timer of a device.

14. The method of claim 1, wherein step (d) of selecting further includes transmitting an invalid validity condition on the medium by the transmitting device for generating an error condition in each of the receiving devices to force the plurality of receiving devices to initialize to a predetermined condition.

15. The method of claim 14, further comprises the step of loading the medium access timer of a device with a value representative of a second predetermined value and the unique medium access number of the device upon determining the error condition.

16. The method of claim 15 wherein the predetermined value is representative of a time for each device to access the medium.

17. In a communication network, having a medium for receiving and transmitting data between a plurality of devices, each device having a receiver for receiving data from the medium; a transmitter for transmitting data to the medium; a medium access timer for controlling access to the medium; a clocking means for providing counting signals to the medium access timer and a gating means coupled to the clocking means for enabling and disabling the counting signals, a method of determining access to the medium by each device comprising the steps of:
   (a) assigning each device a unique medium address;
   (b) loading each medium access timer of each device with a first value representative of the unique medium address of a transmitting device;
   (c) starting a count on each medium access timer by enabling the gating means;
   (d) comparing the count in each medium access timer to a second value representative of the unique medium address;
   (e) transmitting on the medium when a medium access timer reaches the second value, wherein the transmission includes a start of transmission condition, the unique medium address of the transmitting device and an end of transmission condition;
   (f) stopping the count on each medium access timer by disabling the gating means upon receiving the start of transmission condition from the transmitting device;
   (g) loading each medium access timer of each device with a first value representative of the unique medium address of a transmitting device;
   (h) starting a count on each medium access timer by enabling the gating means upon receiving the end of transmission condition from the transmitting device; and
   (i) repeating steps (d) of comparing through step (h) of starting, allowing each device access to the medium access timer of each device.

18. The method of claim 17 wherein the step (h) of starting further comprises the step of:
   (j) delaying the enabling of the gating means for a predetermined number of counting signals.

19. The method of claim 18 wherein the step (g) further comprises the steps of:
   (l) monitoring the medium transmission activity with a medium idle timer;
   (m) generating an error condition when medium transmission activity terminates for a predetermined timer period;
   (n) disabling the gating means upon receiving an error condition;
   (o) loading the medium access timer with a value representative of the unique medium address and a predetermined value representative of the number of devices.

20. A device for controlling the transmission of information over a communication medium, the medium having a plurality of devices operatively coupled to the medium, each device being assigned a unique address, the information including foreground and background messages, the foreground messages having a higher priority of transmission than the background messages, said device comprising:
   (a) means for transmitting information on the medium, wherein the transmitting means, being the only device enabled to transmit information, transmits a start of transmission condition at the beginning of the information followed by the unique address of the transmitting device and an end of transmission condition;
   (b) means for receiving the information transmitted over the communication medium;
   (c) means for detecting background messages within the transmitted information;
   (d) timing means operatively coupled to said receiving means for generating a count, wherein said timing means is disabled to stop the count upon detecting the start of transmission condition and enabled to start the count upon detecting the end of transmission condition;
   (e) means for comparing the count of said timing means to a predetermined count, the device being permitted access to the communication medium to transmit information when the count of said timing means reaches said predetermined count;
   (f) means for loading the timing means of each device when disabled with a count based upon the received unique address of the transmitting device and the unique address of each device;
   (g) means for permitting the transmission of background messages from the device depending upon the condition of the detecting means; and
   (h) means for resetting the detecting means at the end of transmitting information from the device.

21. The device of claim 20, wherein said timing means generates an increasing count upon detecting the end of transmission condition.

22. The device of claim 21, further including a means for receiving said validity condition and generating a validity check condition on the received data to determine an error condition by comparing the validity check condition to the received validity condition.

23. The device of claim 20, wherein said timing means generates a decreasing count upon detecting the end of transmission condition.

24. The device of claim 20, further including a means for generating a validity condition being transmitted after the end of transmission condition, the validity condition being representative of the data transmitted between the beginning of transmission condition and the end of transmission condition, the transmitted information including the validity condition.

25. The device of claim 20, further including a means for monitoring the medium for detecting an idle condition on the medium and generating an error condition upon detecting the idle condition.

* * * * *